United States Patent [19]
Kanaan

[11] Patent Number: 5,641,168
[45] Date of Patent: *Jun. 24, 1997

[54] MACHINE TOOL COLLET WITH AXIAL STOP

[75] Inventor: Roger J. Kanaan, Easley, S.C.

[73] Assignee: Power Tool Holders, Inc., Wilmington, Del.

[*] Notice: The term of this patent shall not extend beyond the expiration date of Pat. No. 5,324,080.

[21] Appl. No.: 456,064

[22] Filed: May 31, 1995

[51] Int. Cl.$^6$ .................................................. B23B 31/20
[52] U.S. Cl. ...................... 279/46.7; 279/46.9; 279/156
[58] Field of Search ...................... 279/46.7, 46.9, 279/49, 54, 156; 408/240

[56] References Cited

U.S. PATENT DOCUMENTS

| | | | |
|---|---|---|---|
| 751,311 | 2/1904 | Leigh, Jr. | 279/54 |
| 1,589,287 | 6/1926 | Ziegler | 279/54 |
| 1,863,107 | 6/1932 | Glenzer | 279/103 |
| 1,899,843 | 2/1933 | Bascom | 279/49 |
| 2,346,706 | 4/1944 | Stoner. | |
| 2,399,393 | 5/1946 | Phillips | 279/54 |
| 2,829,899 | 4/1958 | Drew et al. . | |
| 3,246,903 | 4/1966 | Sattler . | |
| 3,583,714 | 6/1971 | Weltzer et al. . | |
| 4,795,292 | 1/1989 | Dye . | |
| 4,989,887 | 2/1991 | Jordan . | |
| 5,234,050 | 8/1993 | Kanaan | 279/46.7 |
| 5,383,673 | 1/1995 | Moglinicki | 279/49 |
| 5,405,155 | 4/1995 | Kanaan et al. . | |

OTHER PUBLICATIONS

British Standards Institution—Specification for Machine Tool Components Part 7: 1973.
Entwurf, Aug., 1989—Deutsche Norm.
Deutsche Norm—Nov., 1957—Drawback Collets and Taper Sleeves for Collets.
Deutsche Normen—Apr., 1961—Push Out Collets.
Deutsche Normen—May, 1977.
Advertisement—Kennametal—Erickson Rotating NC Tooling.
Advertisement—Jacobs Tap Chucks.
Deutsche Norm—Jul., 1986.
Japanese Industrial Standard—Spring Collets.

*Primary Examiner*—Steven C. Bishop
*Attorney, Agent, or Firm*—Dority & Manning

[57] ABSTRACT

The machine tool collet has a plurality of gripping jaws held in a longitudinally and angularly spaced relation about a longitudinal centerline axis through the collet. The gripping jaws have an inner face parallel to the centerline axis and the plurality of jaws define an inner diameter opening through the collet for receiving a tool shank. Resilient material is disposed between the gripping jaws for holding the plurality of jaws in the desired spaced relation. The radially inward directed stop is defined within the opening of the collet. The stop is disposed so as to contact the rear face of a tool shank inserted into the collet thereby preventing rearward axial movement of the tool shank within the collet.

16 Claims, 2 Drawing Sheets

MACHINE TOOL COLLET WITH AXIAL STOP

BACKGROUND OF THE INVENTION

The present invention relates to a machine tool collet, and more particularly to a machine tool collet having an axial stop defined therein for absorbing axial forces.

Machine tool collets for gripping any manner of tools are well known in the art. For example, U.S. Pat. No. 2,346,706 to Stoner describes a conventional collet of the type having a plurality of flat sided gripping members held in a relative position equally spaced about a common axis by means of resilient material disposed between the blades. This material is typically rubber or rubber composition. An example of this type of collet is the well known Rubber-Flex® collet manufactured and sold by Jacobs® Chuck Manufacturing Company.

Another type of collet is the well known split-steel collet, such as the collets manufactured and sold by Kennametal® of Latrobe, Pa.

With the conventional Rubber-Flex® and split-steel collets for gripping and holding circular tool shanks, the inner diameter gripping surfaces of the respective gripping segments (split-steel collet) and jaw blades (Rubber-Flex® collet) hold the respective tool shanks and absorb both axial and rotational stresses imparted to the tool shank essentially along the entire longitudinal length of the gripping surfaces. For example, with such conventional collets, the only thing preventing undesired axial movement of the tool shank within the collet is the gripping strength or frictional forces between the jaw blades or segments and the tool shank. Thus, the blades or segments are subjected to sheer forces or stress in both the rotational and axial directions. Prevention of undesired axial movement of the tool within the collet is a critical factor and often is the dictating factor for the required gripping strength between the collet and the tool shank.

Thus, a collet which absorbs axial forces or stresses imparted to the gripping jaws or segments such that only rotational stresses are of concern between the gripping surfaces of the segments or blades would be a welcome and needed advancement in the art.

OBJECTS AND SUMMARY OF THE INVENTION

It is therefore a principal object of the present invention to provide an improved collet which absorbs axial forces or stresses imparted to the collet without the necessity of any greater gripping strength between the collet jaw blades and tool shank.

A further object of the present invention is to provide a collet which establishes a standard or known axial stop for a tool shank within the collet, thereby providing for precise axial positioning of the tool shank within the collet.

A further object of the present invention is to provide an improved collet having a substantially longer useful life due to minimized stresses between the jaw blades and a tool shank within the collet.

Additional objects and advantages of the invention will be set forth in part in the following description, or may be obvious from the description, or may be learned through practice of the invention. The objects and advantages of the invention may be realized and attained by means of the instrumentalities and combinations particularly pointed out in the appended claims.

To achieve the objects and in accordance with the purposes of the invention, a machine tool collet is provided which is actuated by engagement with a mating surface of a collet holder, as commonly understood in the art. The collet includes a plurality of gripping jaws held in a desired longitudinally and angularly spaced relation about a longitudinal centerline axis through the collet. The gripping jaws have an inner face parallel to the centerline axis whereby the plurality of gripping jaws define an inner diameter opening through the collet for receipt of a circular tool shank. The gripping jaws have an outer face whereby the plurality of gripping jaws define an outer surface for engaging the collet holder mating surface. Resilient material is disposed between the gripping jaws for holding the plurality of gripping jaws in the desired spaced relation. A radially inward directed stop is defined within the inner diameter opening of the collet. The stop is disposed so as to contact the rear face of a tool shank inserted into the collet thereby preventing rearward axial movement of the tool shank in the collet and absorbing axial forces or stresses imparted to the gripping jaws.

In a preferred embodiment of the invention, the stop is defined by the plurality of gripping jaws wherein at least one of the gripping jaws comprises a planar segment formed within the inner diameter opening perpendicular to the respective inner face of the jaw blade, the planar segment defining the stop against which the rear face of a tool shank rests. Preferably, all of the gripping jaws comprise such a respective planar segment, with the totality of planar segments collectively defining the stop.

In a further preferred embodiment of the invention, the collet includes a continuous outer diameter seal disposed circumferentially about the outer face of the collet and a continuous inner diameter seal disposed circumferentially within the inner diameter opening of the collet. Preferably, the continuous inner and outer diameter seals are formed integral with the resilient material. Preferably, the inner and outer diameter seals comprise double lip seals.

Preferably, the gripping jaws also comprise at least one perforation defined through each jaw. Resilient material extends through these perforations so as to form essentially concentric rings of resilient material through the gripping jaws.

It may further be preferred that longitudinal channels be defined in the resilient material between the gripping jaws. These longitudinal channels serve to increase compressibility of the collet and also serve as coolant channels in the sealing embodiments of the collet.

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
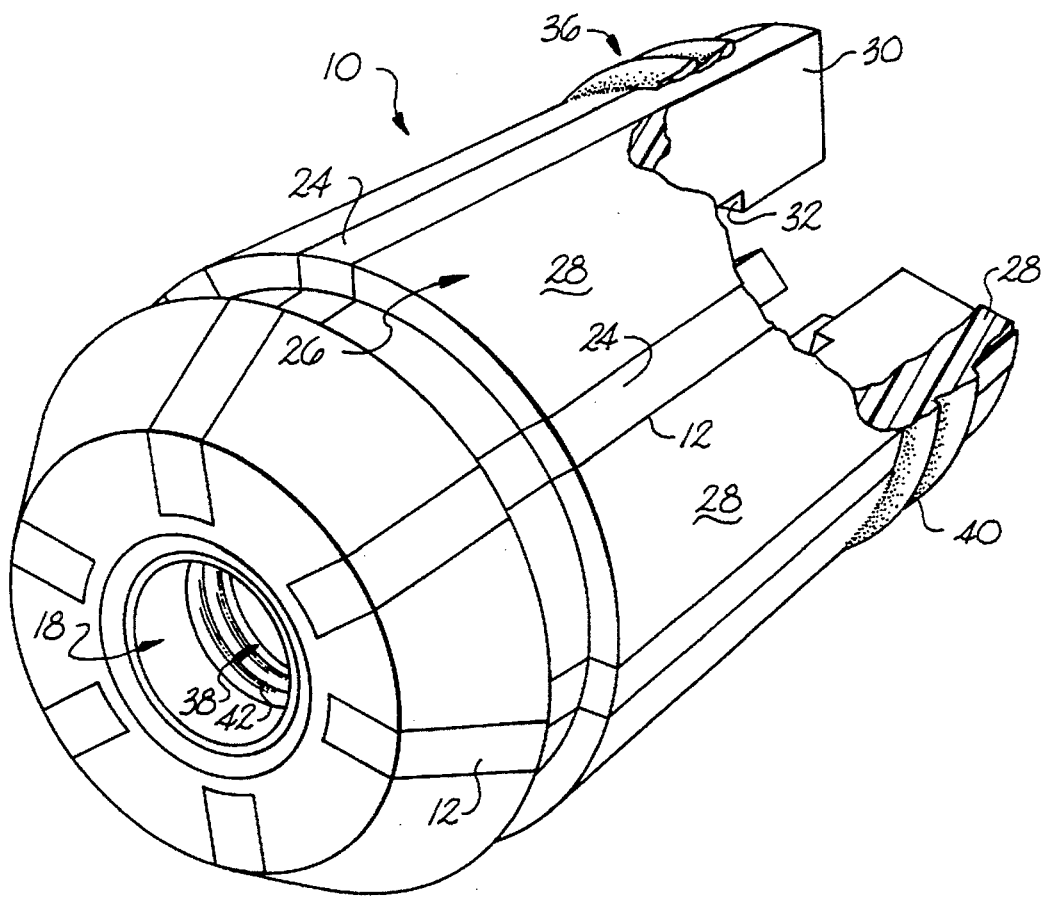
FIG. 1 is a partial cut-away perspective view of a collet according to the invention.

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The numbering of components in the drawings is consistent throughout the application, with the same components having the same number in each of the drawings.

Referring to the figures in general, a collet 10 according to the invention is illustrated. As commonly understood in the art, collet 10 is actuated by engagement with a mating surface of a collet holder (not shown). The operation of collets within collet holders is well understood by those skilled in the art and a detailed explanation thereof is not necessary for purposes of the present disclosure.

Collet 10 includes a plurality of gripping jaws 12. Jaws 12 are held in a desired longitudinally and angularly spaced relation about the longitudinal centerline axis 14 through collet 10. Jaws 12 have an inner face 16 parallel to centerline axis 14. The plurality of jaws 12 and inner faces 16 define an inner diameter opening 18 through the collet for receipt of a tool shank 20, as particularly shown in FIG. 3. Jaws 12 have an outer face 24 such that the plurality of jaws 12 define an outer surface 26 for engaging the collet holder mating surface.

Figure 2:
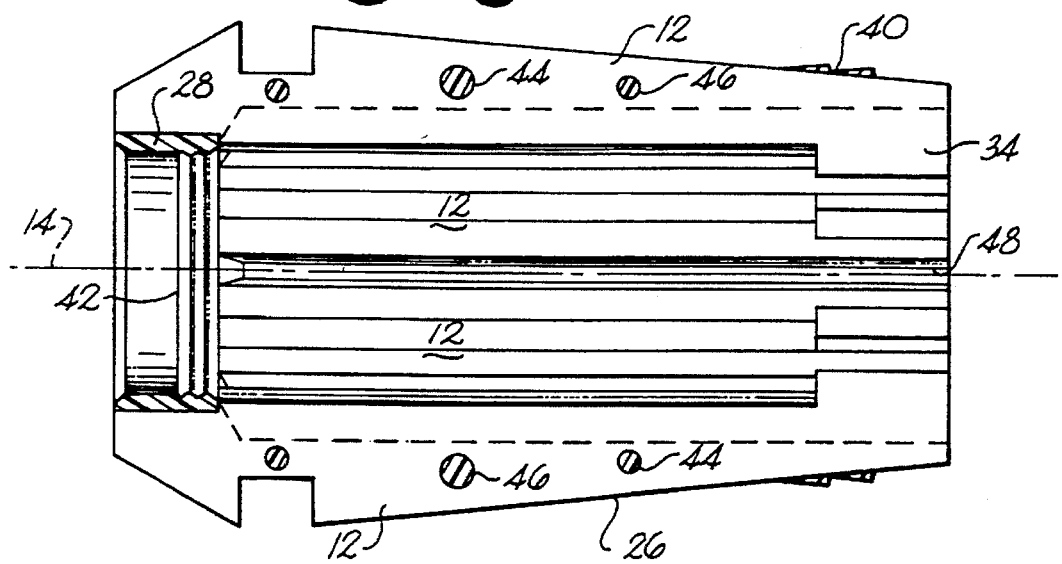
FIG. 2 is a side cut-away view of the collet illustrated in FIG. 1.

Resilient material 28, such as rubber or rubber composition, is disposed between gripping jaws 12 for holding jaws 12 in the desired spaced relation. In a preferred embodiment particularly illustrated in FIG. 2, jaw blades 12 further contain perforations or holes 44 defined therein. In this embodiment, resilient material is disposed between the perforations and essentially defines concentric rings of resilient material 46 through jaw blades 12.

Collet 10 also includes a radially inward directed stop 30 disposed within inner diameter opening 18. Stop 30 is disposed in the rearward section of collet 10 and defines a contacting surface for the rear face 22 of a tool shank 20 inserted within the collet, as particularly shown in FIG. 3. In a preferred embodiment, stop 30 is formed by at least one planar segment 32 formed on at least one jaw blade 12, preferably, the stop is defined by planar segments 32 defined in all of the jaw blades 12. Planar segments 32 are formed by surfaces which are perpendicular to the inner faces 22 of jaw blades 12. As illustrated in the figures, jaw blades may comprise radially inward extending longitudinal segments 34 rearward of planar segments 32. This embodiment may be preferred for ease of manufacture of jaw blades 12, and collet 10 overall.

Collets such as the present collet comprising a plurality of independent gripping jaws held in a spaced relation by resilient material have a far greater degree of compressibility than conventional split steel collets. Accordingly, such collets typically are useful over a range of inner diameters such that one collet may be used with two different diameter tool shanks. Thus, planar segment 32 must extend radially inward at least to a radial position to define stop 30 for the smallest diameter tool shank for which the collet is designed. Preferably, planar segments 32 extend radially inward as far as possible without affecting radial placement of jaw blades 12 around axis 14.

Figure 3:
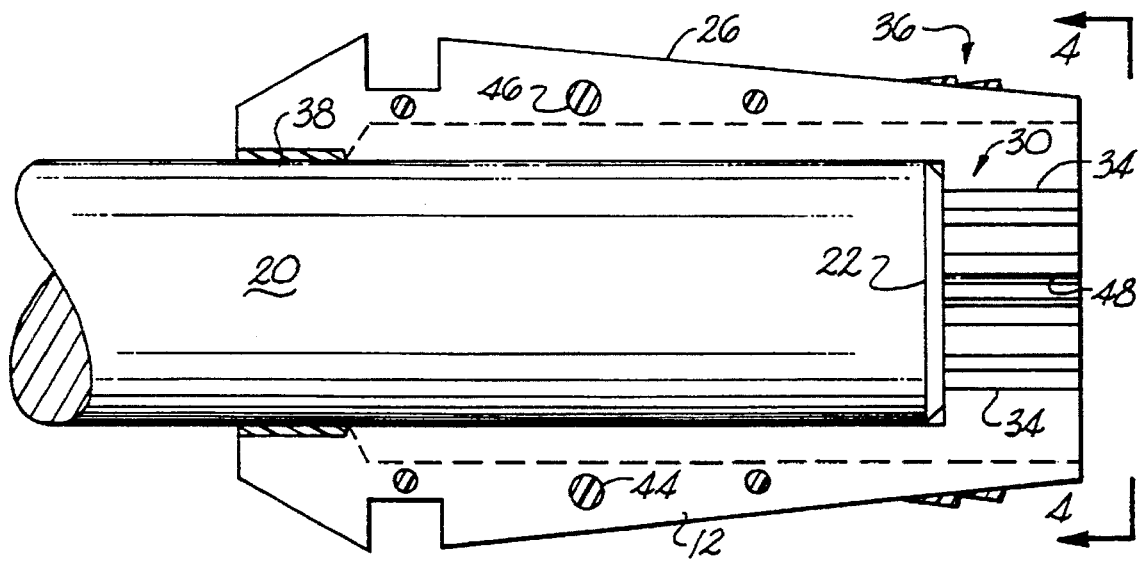
FIG. 3 is a perspective cut-away side view of the collet particularly illustrating a tool shank held within the collet.

Referring particularly to FIG. 3, a circular tool shank is inserted within inner diameter opening 18 such that rear face 22 of the tool shank abuts against stop 30. Thus, in operation of the collet, axial forces imparted to tool shank 20 are transmitted and absorbed directly by the elements comprising stop 30. Thus, the only stresses of concern between the inner faces 22 of the gripping jaws 12 and the circumferential surface of the tool shank 20 are rotational stresses. The jaw blades need only be compressed within the tool holder to prevent rotational movement of the tool shank within the collet. Axial stresses or rearward axial movement between the tool shank and collet jaw blades is no longer of concern with the present invention.

In a preferred embodiment of the present invention, collet 10 includes a continuous outer diameter seal 36 and continuous inner diameter seal 38. Outer diameter seal 36 is disposed circumferentially about the outer faces 24 of jaw blades 12 and extends circumferentially radially outward beyond outer surface 26. Inner diameter seal 38 comprises a continuous seal disposed circumferentially within the inner diameter opening and extends radially inward into the opening. Preferably, the inner and outer diameter seals 36, 38 are formed integral with resilient material 28 and are formed of the same material which comprises resilient material 28. The seals also preferably comprise a double lip outer diameter seal 40 and a double lip inner diameter seal 42, as illustrated in the figures. The design, configuration, and operation of the inner and outer diameter seals are described extensively in my U.S. Pat. No. 5,324,050, which is incorporated herein by reference.

Figure 4:
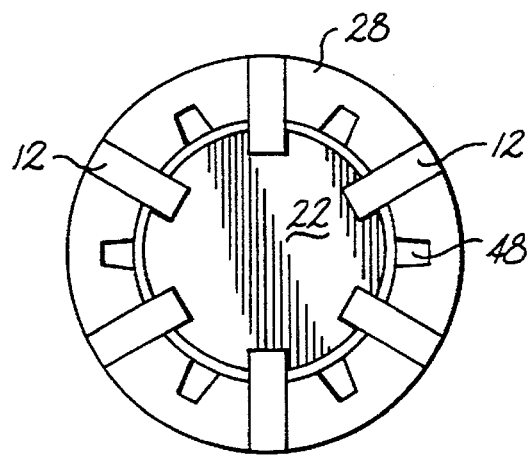
FIG. 4 is an end view of the collet illustrated in FIG. 3 taken along the lines indicated.

Preferably, collet 10 also includes longitudinal channels 48 defined in resilient material 28 between gripping jaws 12 from the back face of the collet up to inner diameter seal 38, as particularly illustrated in FIGS. 3 and 4. Channels 48 serve the dual purpose of increasing compressibility of the collet and serving as coolant induction fluid channels when the collet is used in a sealing configuration. For example, when it is desired to introduce pressurized coolant fluid to the work piece or tool carried by the collet, the pressurized fluid is introduced into the collet holder. The fluid is prevented from leaking around the collet by means of outer diameter seal 36, and flows into the collet by means of longitudinal channels 48. The coolant is prevented from leaking out of collet 10 by means of inner diameter seal 38. Thus, the coolant introduced into the collet 10 is forced to enter coolant holes or channels defined within the tool shank carried by the collet. Alternatively, the coolant may be directed from within collet 10 to a work piece by means of a coolant port defined through the front face of the collet and in communication with the longitudinal channels 48. This embodiment is described extensively in my U.S. Pat. No. 5,405,155, which is also incorporated herein by reference.

It will be apparent to those skilled in the art that various modifications and variations can be made in the present invention without departing from the scope or spirit of the invention. For example, the axial stop 30 may be defined by one of the gripping jaws 12, or may preferably be defined by the plurality of gripping jaws 12. It is intended that the appended claims and their equivalents cover the various modifications and variations which can be made in the apparatus of the present invention.

What is claimed is:

1. A machine tool collet which is actuated by engagement with a mating surface of a collet holder, said collet comprising:

a plurality of gripping jaws held in a desired longitudinally and angularly spaced relation about a longitudinal centerline axis through said collet, said gripping jaws having an inner face parallel to the centerline axis whereby said plurality of gripping jaws define an inner diameter opening through said collet for receiving a tool shank, said gripping jaws having an outer face whereby said plurality of gripping jaws define an outer surface for engaging the collet holder mating surface;

resilient material disposed between said gripping jaws for holding said plurality of gripping jaws in said desired spaced relation;

a radially inward directed stop defined within said opening of said collet, said stop disposed so as to contact the rear face of a tool shank inserted into said collet thereby preventing rearward axial movement of the tool shank; and a continuous outer diameter seal disposed circumferentially about said outer face, said outer diameter seal formed integral with said resilient material and extending circumferentially radially outward beyond said outer faces of said gripping jaws, and a continuous inner diameter seal disposed circumferentially within said inner diameter opening.

2. The collet as in claim 1, wherein said stop is defined by said plurality of gripping jaws.

3. The collet as in claim 2, wherein at least one of said gripping jaws comprises a planar segment formed therein perpendicular to said respective inner face, said planar segment defining said stop.

4. The collet as in claim 3, wherein each said gripping jaws comprises a respective said planar segment, said planar segments collectively defining said stop.

5. The collet as in claim 4, wherein said gripping jaws further comprise a longitudinal segment extending radially inward from said inner face rearward of said planar segment.

6. The collet as in claim 1, wherein said outer diameter seal is disposed nearer the back end of said collet in relation to said collet within a tool holder, and said inner diameter seal is disposed nearer the front end of said collet in relation to said collet within a tool holder.

7. The collet as in claim 1, wherein said inner diameter seal comprises a double lip seal.

8. The collet as in claim 1, wherein said outer diameter seal comprises a double lip seal.

9. The collet as in claim 1, wherein said inner and outer diameter seals are molded integral with said resilient material.

10. The collet as in claim 1, wherein each said gripping jaw further comprises at least one perforation defined therethrough, said resilient material extending through said perforations so as to form essentially a concentric ring of resilient material through said gripping jaws.

11. The collet as in claim 1, further comprising longitudinal channels defined in said resilient material between said gripping jaws.

12. A machine tool collet which is actuated by engagement with a mating surface of a collet holder, said collet comprising:

a plurality of gripping jaws held in a desired longitudinally and angularly spaced relation about a longitudinal centerline axis through said collet, said gripping jaws having an inner face parallel to the centerline axis whereby said plurality of gripping jaws define an inner diameter opening through said collet for receiving a tool shank, said gripping jaws having an outer face whereby said plurality of gripping jaws define an outer surface for engaging the collet holder mating surface;

resilient material disposed between said gripping jaws for holding said plurality of gripping jaws in said desired spaced relation;

a continuous outer diameter seal disposed circumferentially about said outer face, said outer diameter seal formed integral with said resilient material and extending circumferentially radially outward beyond said outer faces of said gripping jaws, and a continuous inner diameter seal disposed circumferentially within said inner diameter opening; and a stop defined within said opening of said collet, said stop disposed so as to contact the rear face of a tool shank inserted into said collet thereby preventing rearward axial movement of the tool shank.

13. The collet as in claim 12, wherein said stop is defined by said plurality of gripping jaws.

14. The collet as in claim 12, wherein at least one of said gripping jaws comprises a planar segment formed therein perpendicular to said respective inner face, said planar segment defining said stop.

15. The collet as in claim 14, wherein each said gripping jaws comprises a respective said planar segment, said planar segments collectively defining said stop.

16. The collet as in claim 15, wherein said gripping jaws further comprise a longitudinal segment extending radially inward from said inner face rearward of said planar segment.

* * * * *

UNITED STATES PATENT AND TRADEMARK OFFICE
CERTIFICATE OF CORRECTION

PATENT NO. : 5,641,168
DATED : June 24, 1997
INVENTOR(S) : Roger J. Kanaan

It is certified that error appears in the above-identified patent and that said Letters Patent is hereby corrected as shown below:

Title page, item [56] under References Cited, line 12, change the date for Kanaan 5,324,050 to 6/1994

Change Moglinicki to Mogilnicki

Signed and Sealed this

Second Day of May, 2000

Attest:

Q. TODD DICKINSON

*Attesting Officer*    *Director of Patents and Trademarks*